J. R. VOORHEES & V. V. SPEER.
SHIFTING AND LOCKING DEVICE FOR CLASH GEARING.
APPLICATION FILED JULY 21, 1910.

1,017,827.

Patented Feb. 20, 1912.

2 SHEETS—SHEET 1.

WITNESSES:
H. B. Burr.
C. B. Kennedy.

INVENTORS
John R. Voorhees
and Victor V. Speer.

BY G. C. Kennedy.
ATTORNEY

COLUMBIA PLANOGRAPH CO., WASHINGTON, D. C.

J. R. VOORHEES & V. V. SPEER.
SHIFTING AND LOCKING DEVICE FOR CLASH GEARING.
APPLICATION FILED JULY 21, 1910.

1,017,827.

Patented Feb. 20, 1912.

2 SHEETS—SHEET 2.

WITNESSES:
H. B. Burr.
C. B. Kennedy.

INVENTORS
John R. Voorhees
and Victor V. Speer.
BY G. C. Kennedy,
ATTORNEY

UNITED STATES PATENT OFFICE.

JOHN R. VOORHEES, OF CEDAR FALLS, AND VICTOR V. SPEER, OF WATERLOO TOWNSHIP, BLACKHAWK COUNTY, IOWA.

SHIFTING AND LOCKING DEVICE FOR CLASH-GEARING.

1,017,827.  Specification of Letters Patent.  Patented Feb. 20, 1912.

Application filed July 21, 1910. Serial No. 573,034.

*To all whom it may concern:*

Be it known that we, JOHN R. VOORHEES and VICTOR V. SPEER, citizens of the United States of America, and residents of Cedar Falls, Blackhawk county, Iowa, and of Waterloo township, Blackhawk county, Iowa, respectively, have invented certain new and useful Improvements in Shifting and Locking Devices for Clash-Gearing, of which the following is a specification.

Our invention relates to improvements in shifting and locking devices for clash-gearing, and the object of our improvements is to provide a hoisting-device which contains two winding-drums, one adapted for forward and the other for reverse rotation, such means as will permit of the use of the drums alternately without interference, such means being adapted to be locked for one drum while the other is being actuated, such means also comprehending devices which act in use to limit the speed of the drums as desired.

Figure 1:
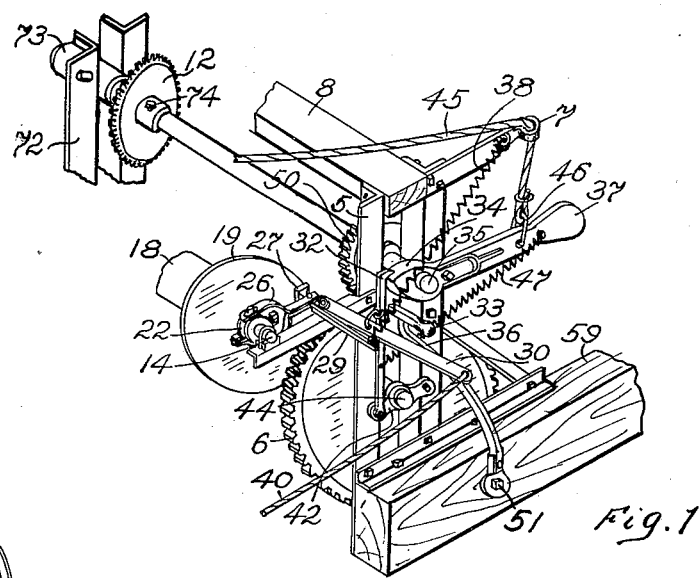
Figure 4:
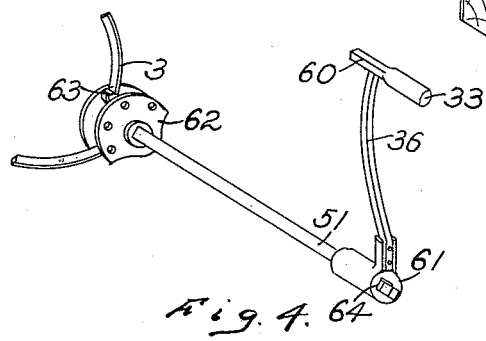
Figure 5:
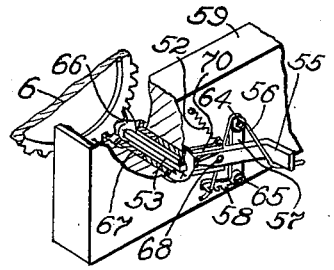
Figure 2:
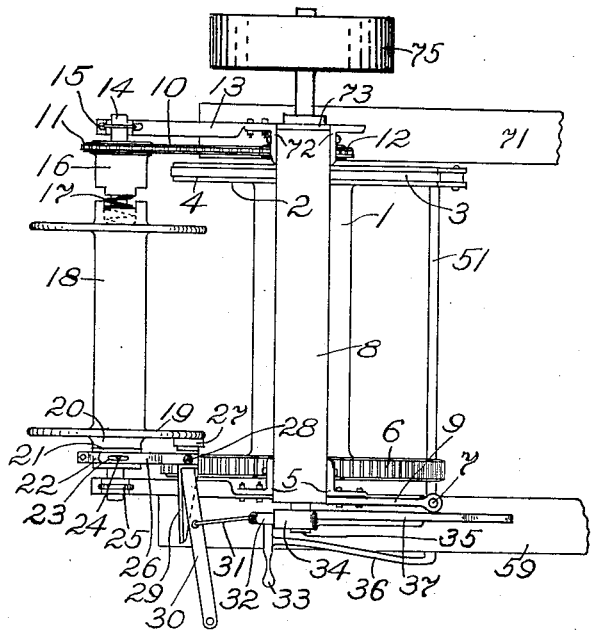
Figure 3:
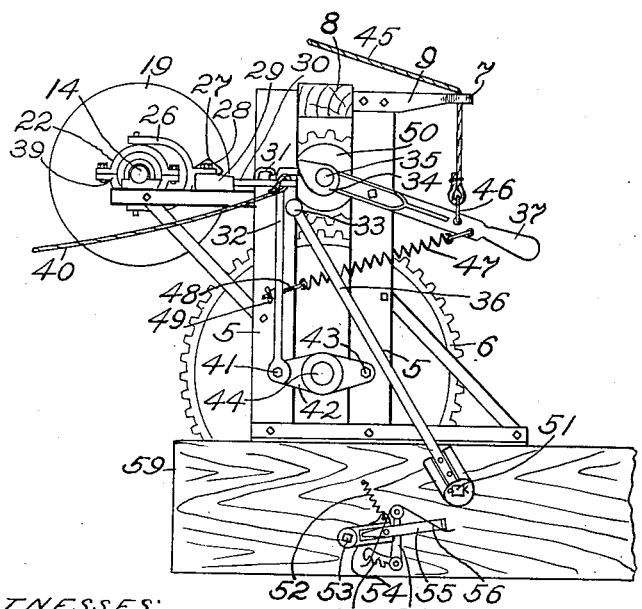

Our invention is, furthermore, designed as an improvement upon the device patented by the United States to Voorhees and Speer, Number 935,711, issued Oct. 5, 1909. This object we have accomplished by the mechanism which is hereinafter described and claimed, and which is illustrated in the accompanying drawings, in which:

Figure 1 is a perspective view of our invention, with parts thereof broken away. Fig. 2 is an upper plan view of said device. Fig. 3 is a right-hand side elevation of said device. Fig. 4 is a perspective detail view of the lever and its operative connections to the band-brake. Fig. 5 is a perspective detail view of the means used for shifting the pawl which engages the teeth of the large gear-wheel secured to the forward winding-drum.

Similar characters of reference designate corresponding parts throughout the several views.

On the parallel base-blocks 59 and 71 are mounted the spaced apart uprights 5 and 72 respectively, their upper parts supporting a transverse beam 8. A transverse power-shaft 35 having a belt-wheel 75 which may be driven by means of any suitable source of power has one end rotatably mounted in a rock-bearing 73 pivoted between the uprights 72. The right-hand end of said power-shaft 35 is rotatably mounted in a bearing in an enlarged head 34 on one end of a hand-lever 37, the latter being medially pivoted to one of the uprights 5. A pinion 50 is mounted on the end of said shaft 35 which is adjacent to the lever 37, while on the opposite end of the shaft a sprocket-wheel 12 is secured by a set-screw 74.

Below the shaft 35 is a shaft 44, one end being fixedly mounted in a bearing (not shown), its other end being fixed in a cross-bar 42, the latter being secured to the uprights 5 by means of bolts 41 and 43. The lower end of a swing-arm 32 is pivoted on the bolt 41, the upper end of this arm being bent forwardly at a right-angle to form a lug or catch adapted to pass over and engage the enlarged head 34 on the lever 37 when the head is lowered sufficiently.

An adjusting-screw 48 is passed through an interiorly threaded opening in the arm 32, and has an adjusting nut 49, the forward part of the screw being connected to one end of a tension-spring 47, whose other end is fastened to the handle-portion of the lever 37. A link 46 connects the end of a trip-rope 45 to the handle-end of said lever, the rope being then passed upwardly through an eyelet 7 on the bracket 9.

A winding-drum 1 is rotatably mounted on the fixed shaft 44, and has two flanges, one of which is grooved at 4 circumferentially to provide a seat for a band-brake 3, while the other flange has circumferential gear-teeth to make it a gear-wheel 6 adapted to intermesh with the pinion 50, when the latter is in its lowered position. The pinion is lowered to intermesh with said gear-wheel by lifting the handle-end of the lever 37 by hand or by the trip-rope, the spring 47 then pulling the lug on the arm 32 over the head 34 of the lever to hold the pinion in mesh.

The ends of the band-brake 3 are connected to cross-pins of paired segments 62 secured to one end of a rock-shaft 51. One end of said shaft rocks in a bearing (not shown), while the other end has a sleeve loosely mounted on its squared extremity 64, which allows some play to the side for the arm 36 which projects upwardly from said sleeve. The upper end of said arm has an outwardly-projecting handle 33, also an inwardly-projecting lug 60.

When the arm 36 is rocked rearwardly, being somewhat pressed in by the operator which is possible because of its loose mounting, it engages the arm 32 by its lugs 60, which throws the bent end of the arm 32 out of engagement with the head 34 of the lever 37 before the rocking of the shaft 51 yet affects the band-brake. The continued rearward movement of the arm 36 causes it to slip away from the arm 32, and in its further progress it rocks the shaft 51 enough to cause the latter to tighten said band-brake upon the flange of the drum 1. Since the spring 47 acts to elevate the pinion 50 out of mesh with the gear-wheel below it when the arm 32 is thrown off of the lever 37, the drum 1 is free to unreel in a reversed direction, and the tension of the brake 3 may be maintained as desired by the use of the arm 36 to either slow down the speed of rotation of said drum or to stop it.

To prevent unreeling of the drum 1 until a desired time, and then to permit of its being freely unreeled, we have provided an auxiliary device intended to act upon a guard-pawl 66 which ordinarily engages roots of teeth on the said gear-wheel 6. This guard-pawl is fixed on the inner end of a squared rock-shaft 53, contained in a sleeve 67, the latter movably seated in a bearing-opening in the base-block 59. The outer end of said sleeve has a grooved crank 70, a tension-spring 52 connecting said crank with said base-block. The spring serves to keep the pawl in yieldable engagement with the teeth of said gear-wheel. The wedge-shaped rear end of an arm 55 is pivoted to said crank 70 within its groove, this mounting being adopted to permit of the rocking of the crank 70 synchronously with the movements of the pawl over the teeth of the gear-wheel without moving the arm 55 appreciably. The outer or forward end of the arm 55 is bent to the right to serve as a pedal. A swinging bracket 57 is hung on a stud 64, and has a stud 65 on which is pivoted a movable arm 58 supplied with depending rack-teeth with which the rearward part of a bent spring 56 may be detachably engaged for variation of tension as desired. The middle of said spring is hung on the stud 64, and its depending forward portion engaged with the pedal of the arm 55. When it is desired to unreel the drum 1, the pedal is pressed down against the yieldable resilient stop-spring 56, the arm 55 then acts to shift the crank 70 and disengage the pawl from the gear-wheel. The latter is then released from the pinion 50, in the manner above described. When the foot of the operator is removed from said pedal, the spring 56 returns the pawl to its engagement with the gear-wheel teeth.

Rearwardly-projecting brackets on the rear uprights 5 and 72 support bearings 25 and 15 respectively for the ends of a fixed axle or shaft 14 on which a winding-drum 18 is slidably and rotatably mounted. Said drum 18 has flanges 19, from one of which projects a concentric clutch-member. From the other flange of said drum projects a concentric hub having a circumferential groove adapted to movably receive the bipartite ring 22 having oppositely-located bearing-studs. A sleeve 16 is rotatably but non-slidably mounted on the shaft 14 and has a clutch-member mating with the like clutch-member on said drum when the latter is slid into engagement therewith. The clutch-member on said drum has a socket adapted to receive a compression-spring 17 which also bears against the adjacent face of the clutch-member on said sleeve 16, tending to keep said members disengaged. The forks of an arm 26 are pivoted on the bearing-studs of the ring 22, and to the forward end of the arm 26 a lever 29 is pivoted at 28. The inner end of the lever 29 is provided with a friction-head 27 adjacent to the drum-flange 19. Said lever is fulcrumed on a stud projecting from a bracket, and has an upwardly-extending flange along its rear edge. A shifting-lever 30 is also pivoted to the stud on which the lever 29 is pivoted, and moves over the upper surface of the latter until stopped by the latter's flange. A trip-rope 40 is connected to the free end of the shifting-lever 30. A link 31 connects the lever 30 and the arm 32. When the operator is at a distance, he can pull the rope 40, which moves the lever 30 back, and trips the arm 32, the pinion 50 then becoming automatically unmeshed from the gear-wheel by means of the means already described. When the lever 30 engages the flange on the lever 29, the latter is shifted back, and the arm 26 caused to slide the winding-drum 18 to the left until its clutch-member engages the clutch-member on the sleeve 16, at the same time compressing the spring 17. A sprocket-wheel 11 is fixed on said sleeve, and a sprocket-chain 10 operatively connects the wheels 11 and 12, the drum 18 thus being rotated by the power-shaft 35. When the lever 30 is released the spring 17 throws the drum 18 to the right out of engagement with the sleeve 16, and the flange on said drum contacts frictionally with the friction-head 27 thus braking said drum.

In Fig. 1 is shown a different means for creating a tension on the lever 30, this being a tension-spring 38 connected between the bracket 9 and said lever. This acts equivalently to the spring 17. As arranged, both drums may be independently rotated and reversed, either being locked while the other is in operation.

It is to be understood that minor variations or changes in the parts of this device are included within the scope of the protection hereof, and within the principles of its operation.

Having described our invention, what we claim as new, and desire to secure by Letters Patent, is:

1. In combination, rotatable winding-drums, a gear-wheel secured concentrically to one of said drums, a rotatable driving-shaft having a pinion mounted thereon, said pinion being movably mounted with relation to said gear-wheel to serve as clash-gearing, a fixed shaft, the other of said drums being both slidably and rotatably mounted thereon, and having a clutch-member on one end, a clutch-sleeve rotatably and non-slidably mounted on said fixed shaft and adapted to engage and mate with the clutch-member on said drum when the latter is moved longitudinally in one direction, and operative connections between said driving-shaft and said clutch-sleeve adapted to communicate rotation to the latter.

2. In combination, rotatable winding-drums, fixed shafts on which said drums are rotatably mounted, a gear-wheel secured concentrically to one of said drums, a rotatable driving-shaft having a pinion thereon, said pinion being movably mounted with relation to said gear-wheel to form clash-gearing, the other of said drums being slidable on its shaft and having on one end clutch-members, a sleeve rotatably and non-slidably mounted on said shaft and having on one end clutch-members adapted to mate with the clutch-members of said drum, means for moving said drum into engagement with said sleeve, resilient-means adapted to move said drum out of engagement with said clutch-sleeve, a sprocket-wheel on said clutch-sleeve, a sprocket-wheel on said driving-shaft, and a sprocket-chain operatively connecting said sprocket-wheels.

3. In combination, rotatable winding-drums, fixed shafts on which said drums are rotatably mounted, a gear-wheel secured concentrically to one of said drums, a rotatable driving-shaft having a pinion thereon, said pinion being movably mounted with relation to said gear-wheel to form clash-gearing, the other of said drums being slidable on its shaft and having clutch-members; a sleeve rotatably and non-slidably mounted on said shaft and having clutch-members adapted to mate with the clutch-members on said drum, means for moving said drum into engagement with the clutch-members on said sleeve, resilient means adapted to move said drum out of engagement with said sleeve when said moving-means are released, a sprocket-wheel on said sleeve, a sprocket-wheel on said driving-shaft, a sprocket-chain operatively connecting said sprocket-wheels, and resilient means connected to said pinion-carrying shaft adapted to act to move said pinion out of mesh with said gear-wheel.

4. In combination, rotatable winding-drums, fixed shafts on which said drums are rotatably mounted, a gear-wheel secured concentrically to one of said drums, a rotatable driving-shaft having a pinion thereon, said pinion being movably mounted with relation to said gear-wheel to form clash-gearing, the other of said drums being slidable on its shaft and having clutch-members on one end, a sleeve slidably and non-rotatably mounted on said shaft and having clutch-members adapted to mate with the clutch-members on said drum, means for moving said drum into engagement with said sleeve, a sprocket-wheel on said clutch-sleeve, a sprocket-wheel on said driving-shaft, a sprocket-chain operatively connecting said sprocket-wheels, resilient means adapted to act upon said last-mentioned drum to move it out of engagement with said clutch-sleeve when said moving-means are released, independent means for braking each drum to limit their speed, a resiliently-governed guard-pawl engaging the teeth of said gear-wheel, and resilient means for disengaging said pawl from the gear-teeth when desired.

5. In combination, a rotatable winding-drum, a fixed shaft on which said drum is rotatably mounted, a gear-wheel secured concentrically to said drum, a rotatable driving-shaft having a pinion mounted thereon, said pinion being movably mounted with relation to said gear-wheel to form clash-gearing, a pivoted lever in which one end of said driving-shaft is rotatably mounted, a trip-rope connected to the handle-end of said lever, a swing-arm having a lug adapted to engage the end of said lever opposite its handle-end to detachably hold the engaged end down to keep the said pinion in mesh with said gear-wheel, a tension-spring connecting said swing-arm and the handle-end of said lever, and means for disengaging the lug on said swing-arm from said lever to free the latter and permit said spring to act thereon to elevate said pinion out of mesh with said gear-wheel.

6. In combination, a rotatable flanged winding drum, a fixed shaft on which said drum is rotatably mounted, a gear-wheel secured concentrically to said drum, a rotatable driving-shaft having a pinion mounted thereon, said pinion being movably mounted with relation to said gear-wheel to form clash-gearing, a pivoted lever in which one end of said driving-shaft is rotatably mounted, a trip-rope connected to the handle-end of said lever, a swing-arm having means for engaging the end of said lever opposite to its handle-end to detachably hold the engaged end down to keep the said pinion in mesh with said gear-wheel, a tension-spring connecting said swing-arm and the handle-end of said lever, a rock-shaft, a band-brake about one of the flanges of said drum and having its ends connected to projections extending from one end of said rock-shaft, a hand-lever having one end loosely connected to the other end of said rock-shaft non-rotatably but permitting side-play to the lever, said lever being suitably formed so as to be adapted to be moved toward and engage said swing-arm when being rocked past it to disengage said arm from the first-mentioned lever, and permit said tension-spring to elevate said pinion out of mesh with said gear-wheel before the further rocking of said rock-shaft tightens said band-brake upon the circumference of the flange of said drum.

7. In combination, a rotatable flanged winding-drum, a fixed shaft on which said drum is rotatably mounted, a gear-wheel secured concentrically to said drum, a rotatable driving-shaft having a pinion mounted thereon, said pinion being movably mounted with relation to said gear-wheel to form clash-gearing, a pivoted lever in which one end of said driving-shaft is rotatably mounted, a trip-rope connected to the handle-end of said lever, a swing-arm having means for engaging the end of said lever opposite to its handle-end to detachably hold the engaged end down to keep the said pinion in mesh with said gear-wheel, a tension-spring connecting said swing-arm and the handle-end of said lever, a rock-shaft, a band-brake about one of the flanges of said drum and having its ends connected to projections extending from one end of said rock-shaft, a hand-lever having one end loosely connected to the other end of said rock-shaft non-rotatably but permitting side-play to the lever, said lever being suitably formed so as to be adapted to be moved toward and engage said swing-arm when being rocked by it to disengage said arm from the first-mentioned lever, and permit said tension-spring to elevate said pinion out of mesh with said gear-wheel before the further rocking of said rock-shaft tightens said band-brake upon the circumference of the flange of said drum, a movable resiliently governed guard-pawl engaging the teeth of said gear-wheel, and resilient means for disengaging said pawl from the teeth of said gear-wheel when desired.

8. In combination, rotatable winding-drums, fixed shafts on which said drums are rotatably mounted, a gear-wheel secured concentrically to one of said drums, a rotatable driving-shaft having a pinion mounted thereon, said pinion being movable with relation to said gear-wheel to form clash-gearing, the other of said drums being slidable on its shaft and having clutch-members on one end, a sleeve rotatably and non-slidably mounted on said shaft and having clutch-members adapted to mate with the clutch-members on the end of said drum, a sprocket-wheel on said sleeve, a sprocket-wheel on said driving-shaft, a sprocket-chain operatively connecting said sprocket-wheels, the last-mentioned winding-drum having a grooved hub on its end opposite to its end having clutch-members, a ring movably seated in the groove in said hub, an arm swiveled to said ring, a fixed support, a lever pivoted to said arm and fulcrumed on said fixed support and supplied on its said pivoted end with a friction-head located adjacent to the abutting end of the last-mentioned winding-drum, said lever having engaging-means on its free end, resilient means acting upon said drum to force it yieldingly against said friction-head, a shifting-lever fulcrumed on said fixed support and movable against the engaging-means on said first-mentioned lever to force it back and slide said drum on its shaft to cause the clutch-members of the latter to engage the clutch-members on said sleeve, a pivoted lever in which one end of said driving-shaft is rotatably mounted, a trip-rope connected to the handle-end of said lever, a trip-rope connected to the free end of said shifting-lever, a swing-arm having engaging-means adapted to detachably engage the end of the pinion-shaft carrying-lever at its end opposite to its handle-end and hold that end down to keep said pinion in mesh with said gear-wheel, a tension-spring adjustably connected between the said swing-arm and the handle-end of said pinion-shaft carrying-lever, a link-connection between said shifting-lever and said swing-arm, and a movable body adapted to detachably engage said swing-arm and force its engaging-means out of engagement with said lever to permit said tension-spring to shift said lever and elevate said pinion out of mesh with said gear-wheel.

Signed at Waterloo, Iowa, this 5th day of July, 1910.

JOHN R. VOORHEES.
VICTOR V. SPEER.

Witnesses:
O. D. YOUNG,
LETA CRABTREE.